United States Patent
Dabak et al.

(10) Patent No.: US 10,860,393 B2
(45) Date of Patent: Dec. 8, 2020

(54) TRACKING DRIVER LOAD AND UNLOAD ON WINDOWS OS

(71) Applicant: NICIRA, INC., Palo Alto, CA (US)

(72) Inventors: Prasad Dabak, Pune (IN); Leena Soman, Pune (IN); Goresh Musalay, Pune (IN)

(73) Assignee: NICIRA, INC., Palo Alto, CA (US)

( * ) Notice: Subject to any disclaimer, the term of this patent is extended or adjusted under 35 U.S.C. 154(b) by 0 days.

(21) Appl. No.: 15/834,071

(22) Filed: Dec. 7, 2017

(65) Prior Publication Data

US 2019/0278636 A1 Sep. 12, 2019

(30) Foreign Application Priority Data

Apr. 22, 2017 (IN) .............................. 201741014343

(51) Int. Cl.
*G06F 9/54* (2006.01)
*G06F 9/445* (2018.01)

(52) U.S. Cl.
CPC .......... *G06F 9/542* (2013.01); *G06F 9/44594* (2013.01); *G06F 9/545* (2013.01)

(58) Field of Classification Search
CPC ....... G06F 9/542; G06F 9/44594; G06F 9/545
See application file for complete search history.

(56) References Cited

U.S. PATENT DOCUMENTS

| 6,253,258 | B1 * | 6/2001 | Cohen | G06F 8/54 |
| | | | | 719/331 |
| 10,713,181 | B1 * | 7/2020 | Makhov | G06F 9/4411 |
| 2006/0253859 | A1 * | 11/2006 | Dai | G06F 9/545 |
| | | | | 719/321 |
| 2014/0137253 | A1 * | 5/2014 | Kasslin | G06F 21/56 |
| | | | | 726/24 |
| 2016/0224789 | A1 * | 8/2016 | Feroz | G06F 21/566 |

* cited by examiner

*Primary Examiner* — Doon Y Chow
*Assistant Examiner* — Kimberly L Jordan
(74) *Attorney, Agent, or Firm* — SU IP Consulting

(57) ABSTRACT

A method is provided for a kernel driver in an operating system to detect loading of images into memory and unloading of the images from memory. The method includes registering a callback routine for load-image notifications, receiving a load-image notification for an image and recording loading of the image, storing original code at or about an entry point of the image, and patching redirect stub code over the original code at or about the entry point. The method also includes receiving, from the redirect stub code, a redirected call to or about the entry point to execute a routine in the image. The redirected call identifies a driver object representing the image. The method further includes, based on the driver object, providing a mechanism to intercept unloading of the image and recording the unloading of the image.

18 Claims, 5 Drawing Sheets

TRACKING DRIVER LOAD AND UNLOAD ON WINDOWS OS

RELATED APPLICATIONS

Benefit is claimed under 35 U.S.C. 119(a)-(d) to Foreign Application Serial No. 201741014343 filed in India entitled "TRACKING DRIVER LOAD AND UNLOAD ON WINDOWS OS", on Apr. 22, 2017, by NICIRA, INC., which is herein incorporated in its entirety by reference for all purposes.

BACKGROUND

A processor in a computer running an operating system (OS) such as Windows has two different modes: user mode and kernel mode. The processor switches between the two modes depending on what type of code is running on the processor. Applications run in user mode, and core OS components run in kernel mode. Most drivers run in kernel mode.

When a user-mode application starts, the OS provides the application with a private virtual address space and a private handle table so one application cannot alter data that belongs to another application. A processor running in user mode also cannot access virtual addresses reserved for the OS so user-mode applications cannot alter, and possibly damage, critical OS data.

All code that runs in kernel mode shares a single virtual address space. This means that a kernel-mode driver is not isolated from other drivers and the OS itself. If a kernel-mode driver accidentally writes to the wrong virtual address, data that belongs to the OS or another driver may be compromised. If a kernel-mode driver crashes, the entire OS crashes.

FIG. 1 illustrates an example communication between user-mode and kernel-mode components.

An OS may allow a kernel-mode driver to register a callback routine that the OS notifies whenever an image, which is a copy of a program at a ready-to-run state, is loaded or mapped into memory. For example, Windows OS provides a load notification routine with the application programming interface (API) PsSetLoadImageNotifyRoutine. Unfortunately, the load notification routine does not notify the callback routine when the same image is unloaded or unmapped from memory, and the OS does not provide an unload notification routine. Furthermore, the load notification routine notifies the callback routine of all types of user-mode and kernel-mode images, including user-mode executables and dynamic link libraries, kernel-mode drivers, display drivers, kernel-mode dynamic link libraries, and other kernel mode components.

Security software may want to reconcile the kernel-mode images loaded or mapped into the system by matching a list generated by the callback routine and the live list maintained by the OS in order to identify rootkits that are trying to hide themselves from the system. Without a mechanism for unload notifications, such reconciliation is not possible.

DETAILED DESCRIPTION

Figure 1:
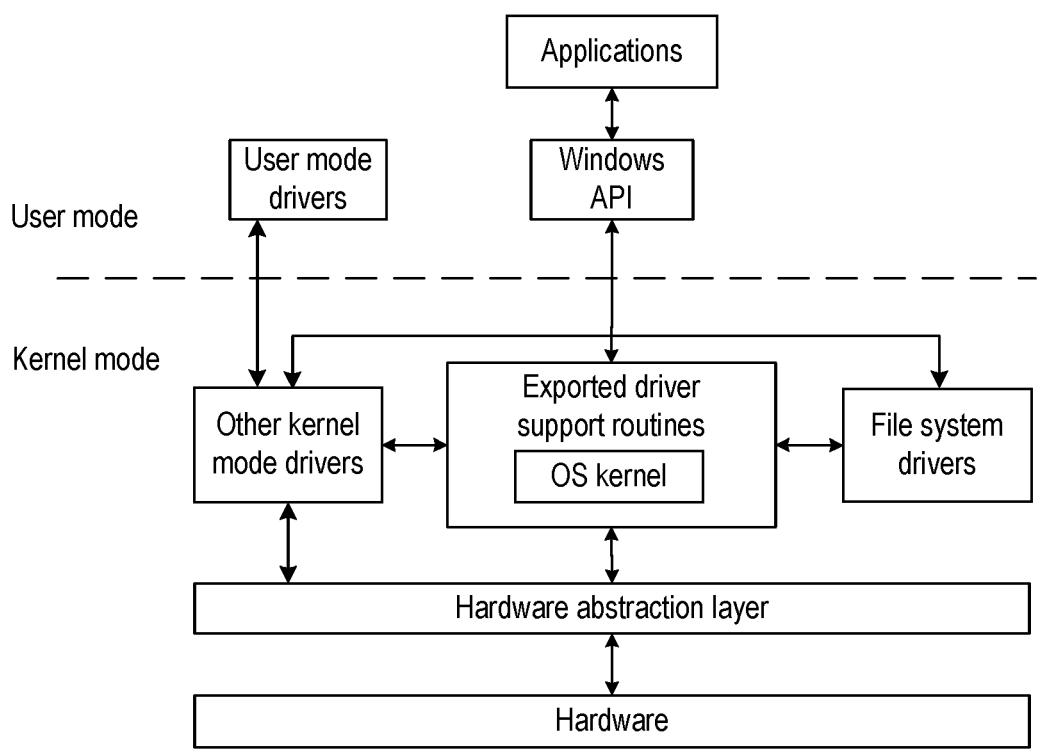
FIG. 1 illustrates an example communication between user-mode and kernel-mode components.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

The present disclosure enables the reconciliation of the loading and the unloading of kernel-mode images of a particular type (e.g., kernel-mode drivers) into memory. In examples of the present disclosure, a reconciliation kernel driver registers with the OS to receive load-image notifications (callbacks). When an image is loaded or mapped to memory, the OS issues a load-image notification to the driver. In response, the driver determines an entry point where execution starts in the image and patches stub code at the entry point to redirect calls to the driver. When a call is made to the entry point (e.g., from the kernel-mode input/output (I/O) manager in the OS), the redirect stub code executes to redirect the call to the driver. In response to the redirected call, the driver unpatches the redirect stub code from the image and determines from the entry point call semantics if the image is a particular type of image, such as one for a kernel-mode driver. When the image is of the particular type, the driver attaches an unload hook to the image's driver object or the image to intercept any call to unload the image. In the present disclosure, "loading" an image into memory may also refer to "mapping" an image into memory.

Figure 2:
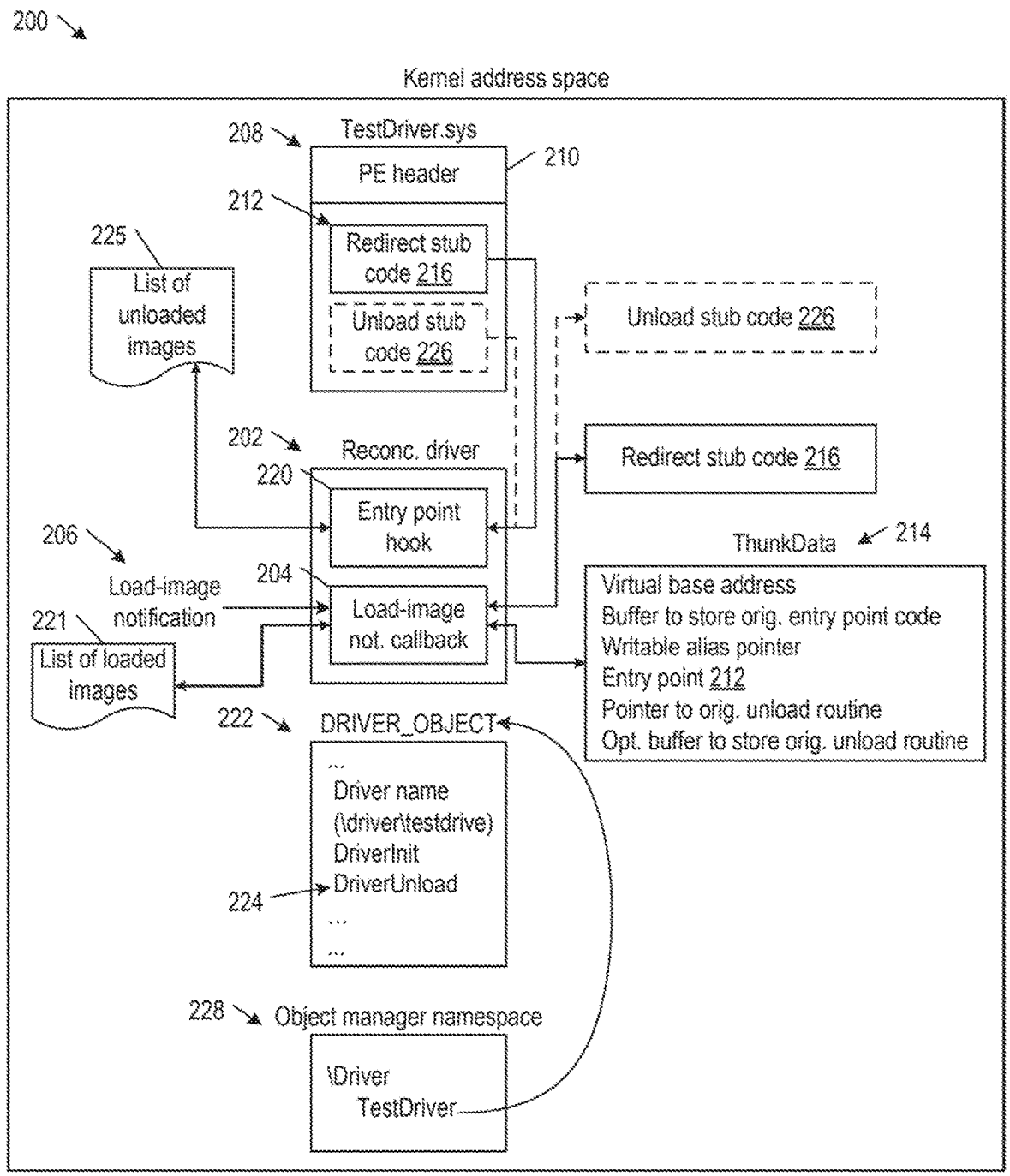
FIG. 2 illustrates a kernel address space loaded with a reconciliation kernel driver in some examples of the present disclosure.

FIG. 2 illustrates a kernel address space 200 loaded with a reconciliation kernel driver 202 in some examples of the present disclosure. Driver 202 may be stored a secondary (nonvolatile) memory (e.g., disk) and loaded for execution into primary (volatile) memory (e.g., random access memory) by a processor in a computer system. Driver 202 registers a load-image notification callback routine 204 with the OS so that the OS notifies the callback routine whenever an image is loaded into memory. When the OS calls back with a load-image notification 206, callback routine 204 determines if the load-image notification maps to a user-mode image or a kernel-mode image (e.g., a TestDriver.sys 208). If a parameter in the load-image notification 206 (e.g., SystemModeImage) indicates the image is a kernel-mode image, callback routine 204 parses the virtual base address of image 208 from load-image notification 206 and performs the following actions.

As a kernel-mode image is a standard portable executable (PE), callback routine 204 parses a PE header 210 of image 208 to determine an entry point 212 where program execution starts (e.g., a DriverEntry routine). Callback routine 204 next dynamically allocates a block of memory (ThunkData) 214 for storing at least the following information:

(1) the virtual base address where image 208 is loaded,
(2) a buffer to store original code in image 208 at entry point 212,
(3) a writable alias pointer to entry point 212, and
(4) entry point 212 of image 208.

As image 208 is located on read-only pages, the writeable alias pointer allows callback routine 204 to patch and unpatch "redirect" stub code 216 (RedirectedEntryPoint) at entry point 212.

Callback routine 204 next dynamically allocates a block of memory and stores a version of the redirect stub code 216 compatible with the OS type (e.g., 32-bit or 64 bit Windows) in the memory block. Based on the size of the redirect stub code 216, callback routine 204 saves away the original code at entry point 212 of the same size in ThunkData 214 and then patches the redirect stub code 216 over the original code in image 208. As a result, a call to entry point 212 causes the redirect stub code 216 to run.

As image 208 is a kernel-mode image, it may map to a kernel-mode dynamic link library, a kernel-mode driver, or any other type of kernel-mode component. There is no deterministic way to identify the image type before patching the redirect stub code 216 over the original code at entry point 212 because there is no meta information in the portable executable that can identify if a given kernel-mode image is a kernel-mode driver or any other type of kernel-mode component. Thus, callback routine 204 patches all kernel-mode images with the redirect stub code 216 at their entry points before another component, an entry point hook 220 (MyModuleEntry), intercepts calls to their entry points and determining their image types from their entry point call semantics (e.g., parameters in the application binary interface). Callback routine 204 may record the loading of image 208 in a list 221 of loaded images in memory.

The redirect stub code 216 is written in assembly language to better manage registers and/or stack to ensure that the original entry point code is called with the appropriate register/stack environment.

When image 208 is loaded, the kernel-mode I/O manager in the OS creates and initializes a data structure DRIVER_OBJECT 222 representing the image. To initialize DRIVER_OBJECT 222, the I/O manager calls the routine at entry point 212 (identified by PE header 210) to fill the DRIVER_OBJECT with pointers to other routines in the image, including its Unload routine. This call to the routine at entry point 212 causes the redirect stub code 216 to redirect the call to entry point hook 220. In addition to the call, the redirect stub code 216 also passes a pointer to ThunkData 214 (provided in the redirect stub code 216 by callback routine 204) to entry point hook 220. Entry point hook 220 may be implemented as a C function.

In response to the redirected call, entry point hook 220 unpatches the redirect stub code 216 at entry point 212 with the original code at the entry point stored in ThunkData 214 and then passes the redirected call to the original entry point to start executing the entry point routine in image 208.

Next, entry point hook 220 identifies if entry point 212 corresponds to a kernel-mode driver by checking if certain parameters are present in the call to the entry point. The kernel has well-defined entry point call semantics for a kernel-mode driver. For example, in Windows, a call to an entry point of an image of a kernel-mode driver includes a pointer to a DRIVER_OBJECT and a pointer to UNI-CODE_STRING. UNICODE_STRING specifies the path to the driver's registry key where startup parameters and other information about a kernel-mode driver are stored. Thus, entry point hook 220 identifies if entry point 212 corresponds to a kernel-mode driver by checking if the call to the entry point has legitimate pointers to DRIVER_OBJECT 222 and UNICODE_STRING (PDRIVER_OBJECT and PUNICODE_STRING). In some examples in a virtualized computing environment described later in more detail, entry point hook 220 uses a safe read function provided by a hypervisor to read the PDRIVER_OBJECT and PUNICODE_STRING in DRIVER_OBJECT 222.

When entry point 212 corresponds to a kernel-mode driver, entry point hook 220 saves away a pointer 224 to the original Unload routine located in DRIVER_OBJECT 222 and replaces the original pointer in the DRIVER_OBJECT with a redirect pointer to itself. When entry point hook 220 receives a call to unload image 208, it restores the original pointer in the DRIVER_OBJECT 222 and passes the call to the original Unload routine in image 208 to unload the image from memory. Entry point hook 220 becomes aware of the unloading of image 208, which it records in a list 225 of unloaded images.

Alternatively, entry point hook 220 patches over at least part of the original unload routine in image 208 with "unload" stub code 226. When a call to unload image 208 is received, the unload stub code 226 redirects the call to entry point hook 220. In response, entry point hook 220 unpatches the unload stub code 226 with the original Unload routine and passes the call to the original Unload routine to unload image 208 from memory. This is a similar process as described above for the redirect stub code 216 and the original Unload routine may be stored in ThunkData 214.

For kernel-mode drivers that are already loaded before reconciliation kernel driver 202 runs, the reconciliation kernel driver may walk an object manager namespace 228 to locate already created DRIVER_OBJECT data structures. For each DRIVER_OBJECT, the reconciliation kernel driver saves and replaces its pointer 224 to the Unload routine (or the Unload routine itself) with a redirect pointer to entry point hook 220 unload stub code 226 (or the unload stub code 226). Similarly, when a call to unload an image is received, entry point hook 220 replaces the redirect pointer (or the unload stub code 226) with the original pointer (or the original Unload routine) and passes the entry point call to the Unload routine to unload image 208 from memory.

Although the kernel-mode drivers are used as an example, the present disclosure may be expanded for other types of kernel-mode images when the entry point semantics are well defined like kernel-mode drivers.

As mentioned above, a kernel-mode image may be an image for either a kernel-mode dynamic link library or a kernel-mode driver. A kernel-mode dynamic link library typically exports functions. Hence, its entry point may never be called. However, the exported functions do get called, and they may be located around the entry point. If these functions are small enough (e.g., less than the redirect stub code 216), then a call to an exported function may jump into the middle of the patched/unpatched code leading to unpredictable results. In order to solve this problem, when callback routine 204 finds a particular kernel-mode image has exported functions from parsing the PE, the callback routine does not directly patch the entry point of the image. Instead, callback routine 204 identifies empty space in code sections of PE and insert the redirect stub code 216 there and then update the PE header's pointer to entry point 212 to point to this redirect stub code. Callback routine 204 stores the location of the redirect stub code 216 in ThunkData 214 in order to remove the redirect stub code later.

Figure 3:
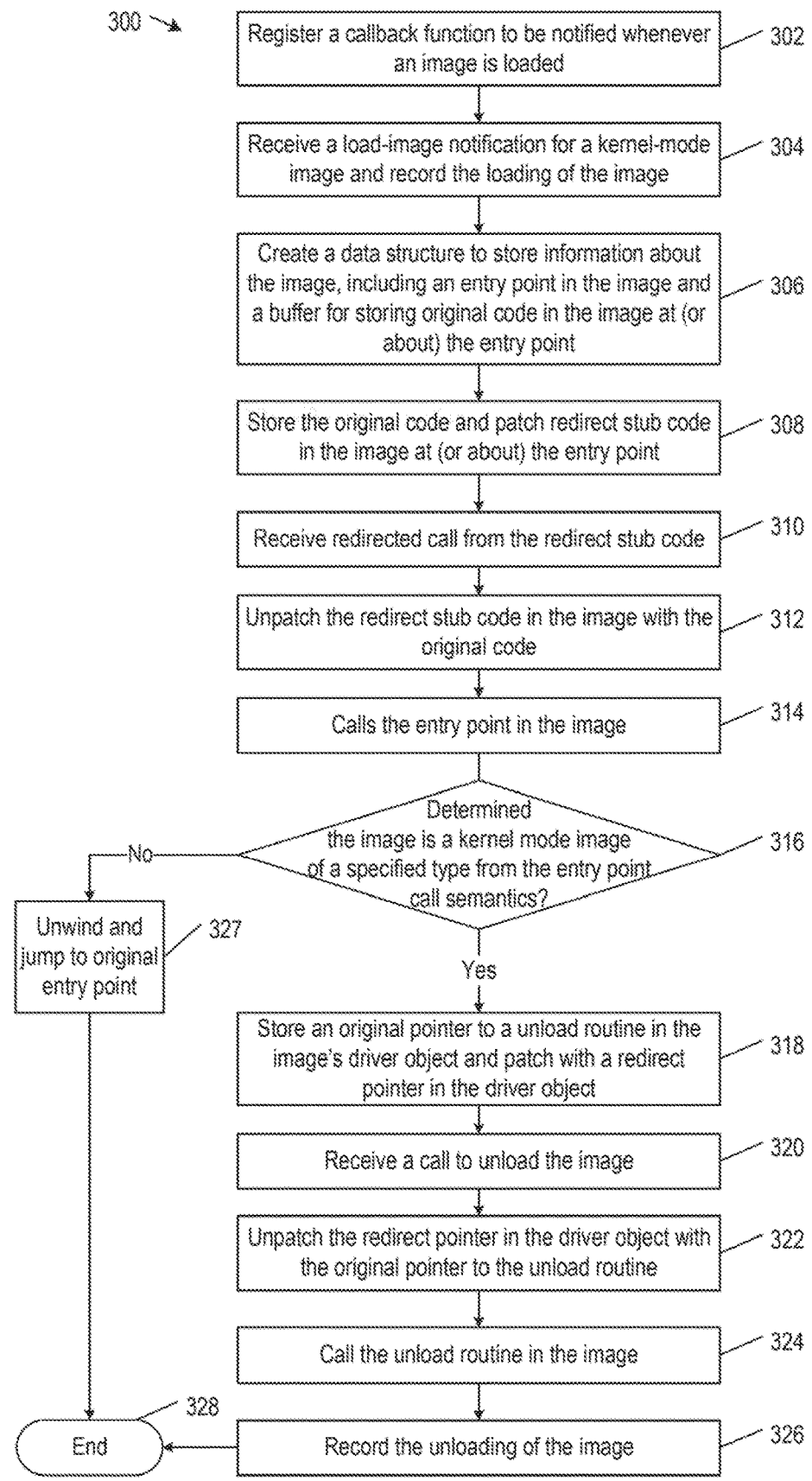
FIG. 3 is a flowchart of a method for the reconciliation kernel driver of FIG. 2 in the OS to detect loading and unloading of images into and from memory in examples of the present disclosure.

FIG. 3 is a flowchart of a method 300 for reconciliation kernel driver 202 in the OS to detect loading and unloading of images into and from memory in examples of the present disclosure. Method 300, and any method described herein, may be implemented as instructions encoded on a computer-readable medium that is to be executed by a processors in a computer system. Method 300, and any method described herein, may include one or more operations, functions, or actions illustrated by one or more blocks. Although the blocks are illustrated in sequential orders, these blocks may also be performed in parallel, and/or in a different order than those described herein. In addition, the various blocks may be combined into fewer blocks, divided into additional blocks, and/or eliminated based upon the desired implementation. Method 300 may begin in block 302.

In block 302, reconciliation kernel driver 202, more specifically entry point hook 220, registers callback routine 204 with the OS so that the OS notifies the callback routine whenever an image is loaded into memory. Block 302 may be followed by block 304.

In block 304, reconciliation kernel driver 202, more specifically callback routine 204, receives a load-image notification 206 for a kernel-mode image from the OS with the virtual base address of image 208. Using the base address of image 208, callback routine 204 locates the image and parses portable executable (PE) header 210 of the image to determine entry point 212 of the image. Callback routine 204 also records the loading of image 208 in list 221 of loaded images). Block 304 may be followed by block 306.

In block 306, callback routine 204 creates data structures to store information about image 208. Callback routine 204 dynamically allocates ThunkData 214 to store at least the virtual base address of image 208, a buffer to store original code at (or about) entry point 212, a writable alias pointer to (or about) the entry point, and the entry point. Callback routine 204 also dynamically allocates a block of memory and stores the redirect stub code 216 in the memory block. As described above, the redirect stub code 216 redirects a call to (or about) entry point 212 to the entry point hook 220 (MyModuleEntry) of reconciliation kernel driver 202. Block 306 may be followed by block 308.

In block 308, callback routine 204 stores the original code at (or about) entry point 212 in ThunkData 214 and patches the redirect stub code 216 at (or about) the entry point in image 208. Based on the size of the redirect stub code 216, callback routine 204 stores the original code of the same size in ThunkData 214.

As described above, when image 208 is loaded, the kernel-mode I/O manager creates and initializes DRIVER_OBJECT 222 representing the image. To initialize DRIVER_OBJECT 222, the I/O manager calls the routine at entry point 212 to fill the DRIVER_OBJECT with pointers to standard routines in the image, including its Unload routine. The redirect stub code 216 receives the entry point call and redirects it to reconciliation kernel driver 202.

Block 308 may be followed by block 310.

In block 310, reconciliation kernel driver 202, more specifically the entry point hook 220, receives the redirected call to (or about) entry point 212 from the redirect stub code 216. The redirected entry point call may include parameters such as pointers PDRIVER_OBJECT and PUNICODE_STRING. Entry point hook 220 also receives a pointer to ThunkData 214 from redirect stub code 216. Block 310 may be followed by block 312.

In block 312, entry point hook 220 unpatches the redirect stub code 216 in image 208 with the original code at (or about) the entry point stored in ThunkData 214. Block 312 may be followed by block 314.

In block 314, entry point hook 220 calls the routine at (or about) entry point 212 with the parameters (e.g., PDRIVER_OBJECT and PUNICODE_STRING) received in the redirected entry point call. In response, the entry point routine fills in DRIVER_OBJECT 222 with pointers to standard routines in image 208, including its Unload routine. Block 314 may be followed by block 316.

In block 316, entry point hook 220 determines if image 208 is a particular type of kernel-mode image. For example, entry point hook 220 determines if image 208 is an image of a kernel-mode driver by analyzing the entry point call semantics. For example, entry point hook 220 determines image 208 is a kernel-mode driver when the redirected entry point call includes legitimate pointers PDRIVER_OBJECT and PUNICODE_STRING. If image 208 is a kernel-mode image of a particular type, block 316 may be followed by block 318. Otherwise, block 316 may be followed by block 327, which may be followed by block 328 that ends method 300.

In blocks 318 to 324, reconciliation kernel driver 202 provides a mechanism to intercept unloading of the image.

In block 318, reconciliation kernel driver 202 stores the original pointer to the Unload routine in DRIVER_OBJECT 222 and patches a redirect pointer to itself over the original pointer in the DRIVER_OBJECT. For example, entry point hook 220 calls callback routine 204 to store the original pointer to the Unload routine in ThunkData 214 and replace the original pointer in DRIVER_OBJECT 222 with the redirect pointer to the entry point hook. Block 318 may be followed by block 320.

In block 320, reconciliation kernel driver 202, more specifically entry point hook 220, receives a call to unload image 208. Block 320 may be followed by block 322.

In block 322, entry point hook 220 replaces the redirect pointer in DRIVER_OBJECT with the original pointer to the Unload routine stored in ThunkData 214. Block 322 may be followed by block 324.

In block 324, entry point hook 220 calls the original Unload routine in image 208 with the parameters received in the call to unload the image. Block 324 may be followed by block 326.

In block 326, entry point hook 220 records the unloading of image 208 in list 225 of unloaded images. Block 326 may be followed by block 328, which ends method 300.

In some other examples of the present disclosure, reconciliation kernel driver 202 provides another mechanism to intercept unloading of the image in blocks 318 to 324.

In alternative block 318, reconciliation kernel driver 202 stores at least part of the original Unload routine in image 208 and patches the unload stub code 226 over the original Unload routine in the image. For example, entry point hook 220 calls callback routine 204 to store at least part of the original Unload routine having the same size as the unload stub code 226 in ThunkData 214 and patch the unload stub code over the original Unload routine in image 208. Alternative block 318 may be followed by alternative block 320.

In alternative block 320, reconciliation kernel driver 202, more specifically entry point hook 220, receives a redirected call to unload image 208 from the unload stub code 226. Alternative block 320 may be followed by alternative block 322.

In alternative block 322, entry point hook 220 unpatches the unload stub code 226 in image 208 with the original Unload routine stored in ThunkData 214. Alternative block 322 may be followed by alternative block 324.

In alternative block 324, entry point hook 220 calls the original Unload routine in image 208 with the parameters received in the redirected call from the unload stub code 226 to unload the image. Alternative block 324 may be followed by block 326 as described above.

In block 327, entry point hook 220 unwinds the stack/register and jumps to the original entry point 212 as if nothing was intercepted. This is performed because the entry point call semantics are unknown so entry point hook 220 unwinds whatever state was created for the purpose of interception and chains onto the original entry point 212. Block 327 may be followed by block 328, which ends method 300.

The examples of the present disclosure may be implemented in a physical computing environment with an OS on a physical computer or a virtualized computing environment with a guest OS on a virtual machine.

Figure 4:
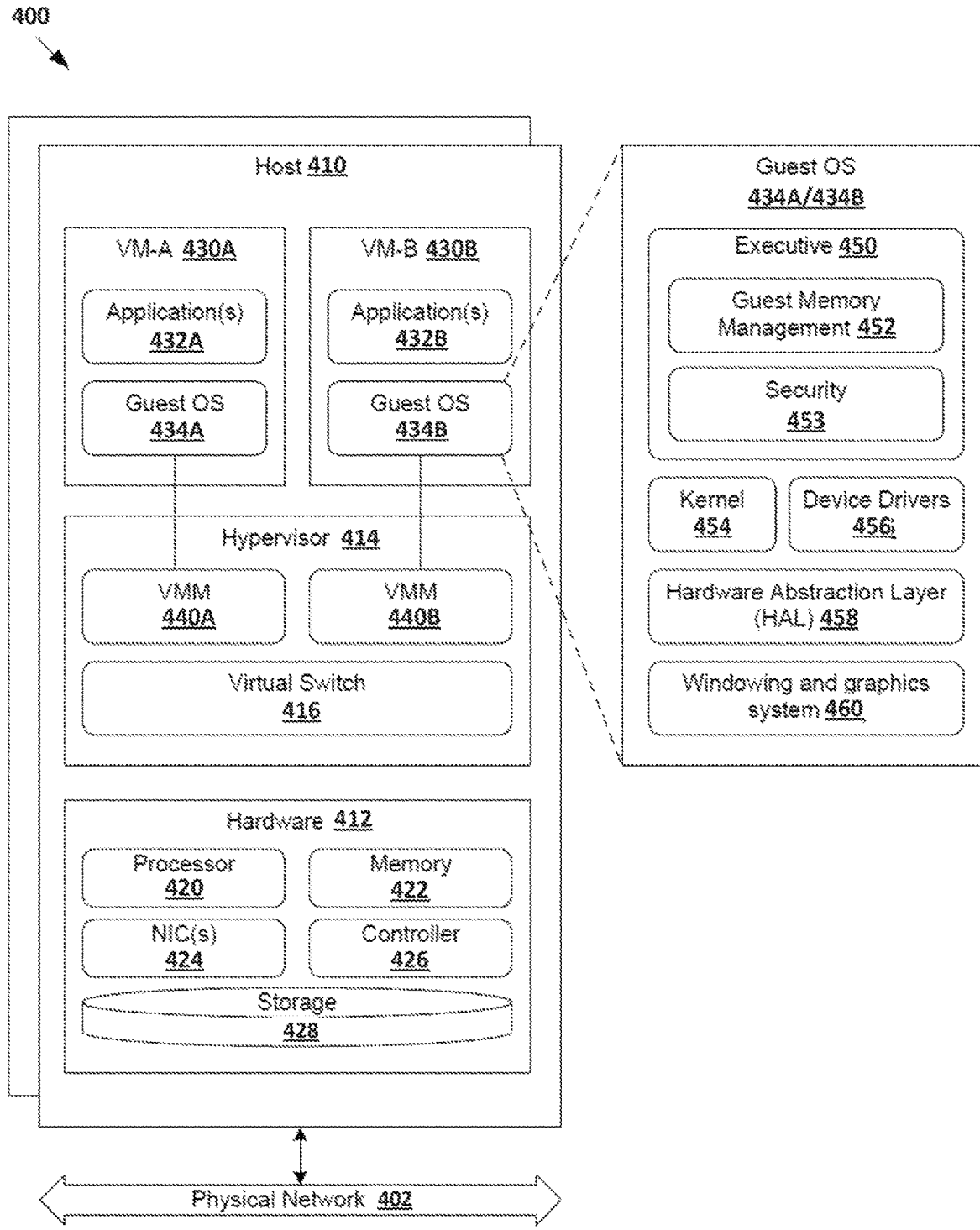
FIG. 4 is a block diagram illustrating a virtualized computing environment in examples of the present disclosure.

FIG. 4 is a block diagram illustrating a virtualized computing environment 400 in examples of the present disclosure. Environment 400 includes multiple hosts 410 (also known as "computing devices", "host computers", "host devices", "physical servers", "server systems", etc.) connected via physical network 402. Each host 410 includes hardware 412 and hypervisor 414 to support multiple guest virtual machines, such as VM-A 430A and VM-B 430B. Throughout the present disclosure, the term "hypervisor" may refer to any suitable computer hardware virtualization software that enables multiple virtual machines to execute simultaneously on a single host, such as VMware ESX® (available from VMware, Inc.). In practice, each host 410 may support tens or hundreds of virtual machines (two shown for simplicity in FIG. 4). The term "hypervisor" also includes system-level software that supports namespace containers such as Docker, etc.

Hypervisor 414 maintains a mapping between underlying hardware 412 and virtual resources allocated to virtual machines 430A, 430B. For example, hardware 412 includes processor(s) 420, physical memory 422 (e.g., random access memory (RAM)), physical network interface controller(s) or NIC(s) 424 to provide access to physical network 402, and storage disk(s) 428 (e.g., solid state drive, hard disk drive) accessible via storage controller 426, etc. In practice, hypervisor 414 may also be a "type 2" or hosted hypervisor that runs on top of a conventional operating system on host 410. Hypervisor 414 also implements virtual switch 416 to handle egress packets forwarding from, and ingress (i.e., incoming) packets to, virtual machines 430A, 430B.

VM-A 430A and VM-B 430B each represent a software implementation of a physical machine. Virtual resources are allocated to virtual machine 430A/430B to support guest OS 434A/434B, and application(s) 432A/432B, etc. Corresponding to hardware 412, the virtual resources may include virtual CPU, virtual memory, virtual disk, virtual network interface controller (vNIC), etc. Hardware resources may be emulated using virtual machine monitor (VMM) 440A/440B implemented by hypervisor 414. In practice, VMM 440A/440B may be considered as part of virtual machine 130A/130B, or alternatively, separated from the virtual machine.

Guest OS 434A/434B may be implemented using any suitable operating system, such as Microsoft Windows (trademark of Microsoft Corporation), Linux (trademark of Linux Mark Institute), etc. Using Microsoft Windows (e.g., Windows NT) as an example, guest OS 434A/434B may include various kernel-mode components, such as executive 450, kernel 454, device drivers 456, hardware abstraction layer (HAL) 458, and windowing and graphics system 460. In more detail, executive 450 provides base OS services, such as guest memory management 452, security 453, process and thread management, I/O, networking, and inter-process communication. Kernel 454 provides low-level OS functions, such as thread scheduling, interrupt and exception dispatching, and multiprocessor synchronization.

Device drivers 456 include both hardware device drivers that translate user I/O function calls into specific hardware device I/O requests, as well as non-hardware device drivers such as file system and network drivers. HAL 458 is a layer of code that isolates kernel, device drivers and the rest of guest OS from platform-specific hardware differences. Windowing and graphics system implements the graphical user interface (GUI) functions, such as for interface controls, drawing, etc. In practice, the core components of guest OS 434A/434B are usually stored in system files. For example, kernel image NTOSKRNL.EXE is used to implement executive 450 and kernel 445 layers of guest OS 434A/434B, HAL.DLL to implement HAL 458, Win32k.sys to implement a kernel-mode part of the Windows subsystem, etc.

To facilitate memory management, existing operating systems introduce a layer of abstraction between memory addresses used by applications, and memory addresses associated with the physical memory. When an application requests memory, the operating system will allocate memory in a virtual memory address space and map it to a physical memory address space. A page table is used to store mapping information between the address spaces. If an application attempts to access a virtual memory address that is not mapped to the physical memory address space, the operating system will detect a page fault.

In the context of hardware virtualization in FIG. 4, three levels of memory address space may be used. An example in shown in FIG. 5, which is a block diagram illustrating example address space mapping 500 implemented on host 410 in virtualized computing environment 400. At a first level, applications 432A/432B executing on virtual machine 430A/430B may access guest virtual memory address space 510A/510B. At a second level, guest virtual memory address space 510A/510B may be mapped to guest physical memory address space 520A/520B associated with virtual memory allocated to virtual machine 430A/430B by hypervisor 414. At a third level, guest physical memory address space 520A/520B may be mapped to host physical memory address space 530 of the underlying physical memory 422 (e.g., RAM) of host 410. It should be noted that guest physical memory address space 520A/520B is "physical" from the perspective of guest OS 434A/434B, but "virtual" from the perspective of hypervisor 414.

Mappings between the first level and second level are maintained by guest OS 434A/434B. For example in FIG. 5, at VM-A 430A, guest OS 434A maintains mappings between guest virtual memory address space=VA1 to VAN (see 510A) to guest physical memory address space=PA1 to PAN (see 520A). Similarly, at VM-B 430B, guest OS 434B maintains mappings between guest virtual memory address space=VB1 to VAM (see 510B) to guest physical memory address space=PB1 to PBM (see 520B). In practice, the size of guest virtual memory address space 510A/510B may be different from (e.g., larger) the size of the guest physical virtual memory address space 520A/520B.

Mappings between the second level and third level are maintained by hypervisor 414. For example in FIG. 5, guest physical memory address spaces 520A, 520B are both mapped to host physical memory address space=HA1 to HAK. By controlling the mappings, hypervisor 414 ensures that different VMs do not bump into one another in the underlying physical memory 422. At each level, the corresponding memory may be divided into chunks called "pages" (e.g., guest physical memory pages of size=4 KB per page). Memory mappings or translations may be implemented using page tables.

Figure 5:
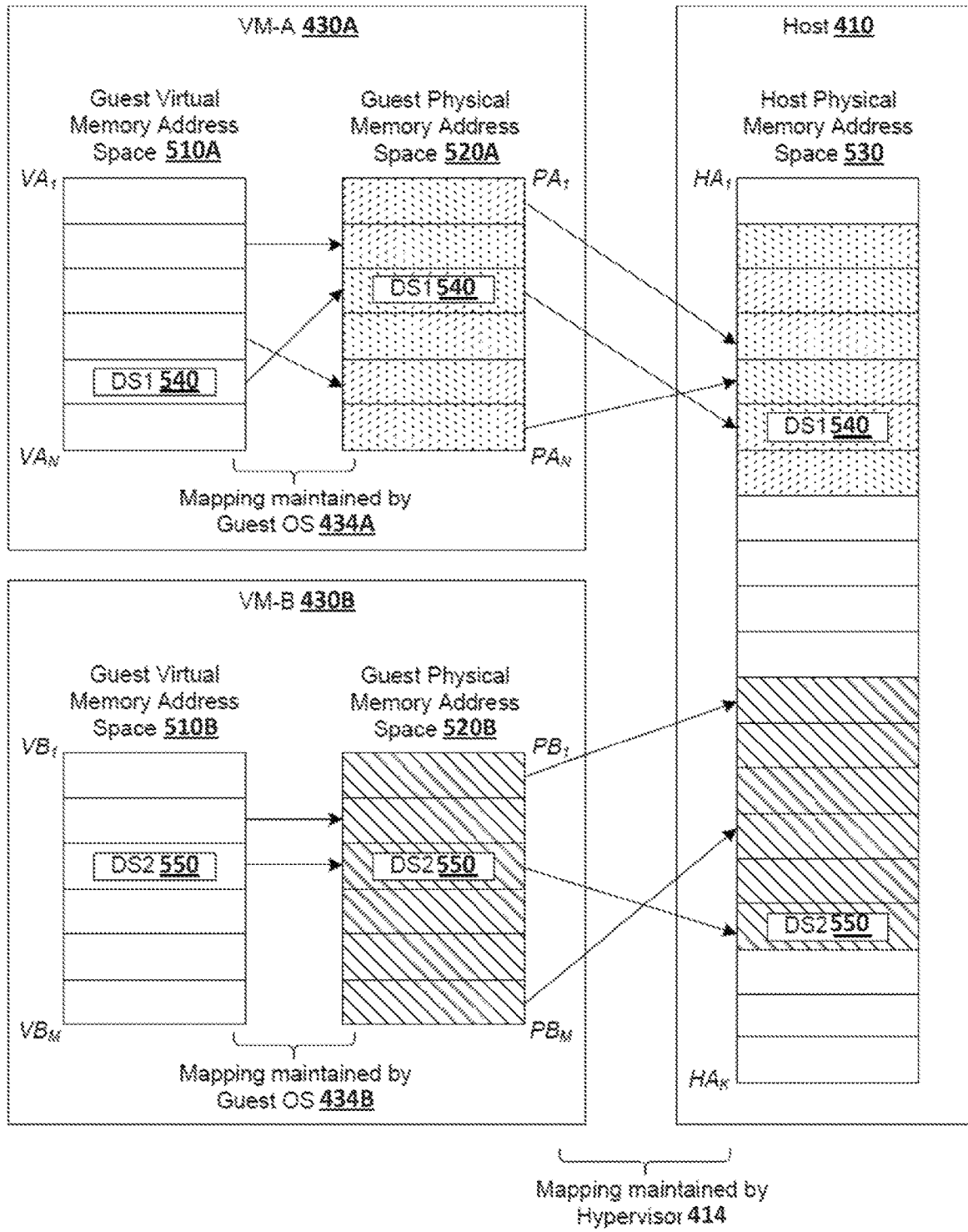
FIG. 5 is a block diagram illustrating address space mapping implemented on a host in the virtualized computing environment of FIG. 4 in examples of the present disclosure.

Using the example in FIG. 5, different memory addresses (e.g., guest virtual memory address, guest physical memory address, and host physical memory address) may refer to the same location in the underlying electronic storage. For example, an OS data structure (e.g., DS1 540 of VM-A 430A, DS2 550 of VM-B 430B) may be located using different addresses within respective guest virtual memory address space 510A/510B, guest physical memory address space 520A/520B and host physical memory address space 530.

It should be noted that, when used in the context of memory management, the term "virtual" in "guest virtual memory address space," "guest virtual memory address" and the like may refer generally to the technique of presenting an abstraction of the memory allocated to a virtual machine, and the physical memory of the host. The use of the term "virtual" in the context of memory management is distinguishable from the use of the same term in the context hardware virtualization, such as "virtual machine" representing a software implementation of a physical machine.

When the examples of the present disclosure are in a virtualized computing environment, entry point hook 220 may use a safe read function provided by a hypervisor to read the PDRIVER_OBJECT and PUNICODE_STRING in DRIVER_OBJECT 222. It should be understood that any suitable approach may be used to configure hypervisor 414 to perform "safe read" to access an arbitrary guest virtual memory address range without causing a crash at guest OS 434A/434B, such as when reading invalid or paged out locations, etc. One example approach is to register, with hypervisor 414, instruction pointer=SAFE_READ_INSTRUCTION_PTR to a memory copy function to cause hypervisor 414 to absorb any fault that arises from data access using the memory copy function.

In more detail, the memory copy function may be implemented in assembly language, such as "repz stosb" instruction using Intel (a trademark of Intel Corporation) as an example. A pre-requisite for the instruction is to fill in the register source index (RSI) to point to a source buffer, register destination index (RDI) to point a destination buffer, and the register C extended (RCX) register to hold the number of bytes to copy. The instruction results in copying RCX bytes from memory pointed by RSI to memory pointed by RDI. At end of the instruction, the RCX drops down to zero if the copy is successful.

The memory copy function may then be called for performing safe read on target addresses for PDRIVER_OBJECT and PUNICODE_STRING in DRIVER_OBJECT 222.

If the location points to an invalid/paged out location, the page fault is first delivered to hypervisor 414, which figures that the page fault is happening from the registered instruction pointer=SAFE_READ_INSTRUCTION_PTR. In this case, hypervisor 414 absorbs the fault and sets the instruction pointer to the next instruction. The next instruction checks the contents of RCX register to determine whether the copy has succeeded or failed. If RCX is zero, the copy has succeeded. Otherwise, it has failed.

When the examples of the present disclosure are in a physical computing environment, entry point hook 220 may use a different type of safe read to read the PDRIVER_OBJECT and PUNICODE_STRING in DRIVER_OBJECT 222. For example, the OS may have an API (if any) that can validate the range of memory addresses before reading them. In another example, the OS page fault handler may be replaced with a different fault handler that absorbs a page fault stemming from a registered instruction pointer=SAFE_READ_INSTRUCTION_PTR.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method for a kernel driver in an operating system to detect loading of images into memory and unloading of the images from memory, the method comprising:
   registering a callback routine for load-image notifications;
   receiving a load-image notification for an image and recording loading of the image;
   storing original code at an entry point of the image and patching redirect stub code over the original code at the entry point;
   receiving, from the redirect stub code, a redirected call to the entry point to execute a routine in the image, the redirected call identifying a driver object representing the image;
   determining if the image is a kernel-mode image of a specified type after receiving the redirected call to the entry point to execute the routine in the image;
   based on the driver object, in response to determining the image is the kernel-mode image of the specified type, providing a mechanism to intercept unloading of the image; and
   in response to the mechanism intercepting the unloading of the image, recording the unloading of the image.

2. The method of claim 1, further comprising:
   creating a data structure to store the entry point and the original code at the entry point; and
   determining a size of the redirect stub code prior to storing the original code at the entry point, wherein the original code at the entry point comprising the same size as the redirect stub code.

3. The method of claim 1, further comprising, unpatching the redirect stub code in the image with the original code at the entry point prior to determining if the image is the kernel-mode drivcrimage of the specified type.

4. The method of claim 3, further comprising calling to the entry point with parameters from the redirected call to execute the routine in the image after unpatching the redirect stub code.

5. The method of claim 3, wherein determining if the image is the kernel-mode drivcrimage of the specified type comprises analyzing semantics of the redirected call.

6. The method of claim 1, wherein patching the redirect stub code over the original code at the entry point comprises identifying an empty space in code sections of the image, inserting the redirect stub code in the empty space, and modifying a pointer to the entry point in a header of the image to point the redirect stub code.

7. The method of claim 1, wherein:
providing the mechanism to intercept unloading of the image comprises:
storing an original pointer to an unload routine from the driver object and patching a redirect pointer to the kernel driver over the original pointer in the drive object; and
receiving a call to unload the image; and
recording the unloading of the image is performed in response to the call to unload the image.

8. The method of claim 7, further comprising:
unpatching the redirect pointer in the driver object with the original pointer; and
calling the original unload routine in the image with parameters from the call to unload the image.

9. The method of claim 1, wherein:
providing the mechanism to intercept unloading of the image comprises:
storing an original unload routine from the image and patching an unload stub code over the original unload routine in the image; and
receiving, from the unload stub code, a redirected call to unload the image; and
recording the unloading of the image is performed in response to the redirected call to unload the image.

10. The method of claim 9, further comprising:
unpatching the unload stub code in the image with the original unload routine; and
calling the original unload routine in the image with parameters from the redirected call to unload the image.

11. The method of claim 1, further comprising:
walking driver objects in an object manager namespace; and
for each driver object, providing a mechanism to intercept unloading of a corresponding image.

12. A non-transitory, computer-readable storage medium encoded with instructions executable by a processor to provide a kernel driver in an operating system to detect loading of images into memory and unloading of the images from memory, the instructions comprising:
registering a callback routine for load-image notifications;
receiving a load-image notification for an image and recording loading of the image;
storing original code at an entry point of the image and patching redirect stub code over the original code at the entry point;
receiving, from the redirect stub code, a redirected call to the entry point to execute a routine in the image, the redirected call identifying a driver object representing the image;
determining if the image is a kernel-mode image of a specified type after receiving the redirected call to the entry point to execute the routine in the image;
based on the driver object, in response to determining the image is the kernel-mode image of the specified type, providing a mechanism to intercept unloading of the image; and
in response to the mechanism intercepting the unloading of the image, recording the unloading of the image.

13. The storage medium of claim 12, wherein the instructions further comprise:
creating a data structure to store the entry point and the original code at the entry point; and
determining a size of the redirect stub code prior to storing the original code at the entry point, wherein the original code at the entry point comprising the same size as the redirect stub code.

14. The storage medium of claim 12, wherein the instructions further comprise:
unpatching the redirect stub code in the image with the original code at the entry point prior;
calling to the entry point with parameters from the redirected call to execute the routine in the image; and
after unpatching the redirect stub code, determining if the image is the kernel-mode image of the specified type.

15. The storage medium of claim 12, wherein patching the redirect stub code over the original code at the entry point comprises identifying an empty space in code sections of the image, inserting the redirect stub code in the empty space, and modifying a pointer to the entry point in a header of the image to point the redirect stub code.

16. The storage medium of claim 12, wherein the instructions further comprise:
providing the mechanism to intercept unloading of the image comprising:
storing an original pointer to an unload routine from the driver object or the unload routine from the image;
patching a redirect pointer to the kernel driver over the original pointer in the driver object or an unload stub code over the unload routine in the image;
receiving a call to unload the image;
unpatching the redirect pointer in the driver object with the original pointer or the unload stub code in the image with the unload routine; and
calling the unload routine in the image with parameters from the call to unload the image; and
recording the unloading of the image is performed in response to the call to unload the image.

17. The storage medium of claim 12, wherein the instructions further comprise:
walking driver objects in an object manager namespace; and
for each driver object, providing a mechanism to intercept unloading of a corresponding image.

18. A computer system, comprising:
a main memory;
a secondary memory storing an operating system and a kernel driver for the operating system;
a processor loading the kernel driver from secondary memory to main memory and executing the kernel driver to:
register a callback routine for load-image notifications;
receive a load-image notification for an image and record loading of the image;
store original code at an entry point of the image and patching redirect stub code over the original code at the entry point;
receive, from the redirect stub code, a redirected call to the entry point to execute a routine in the image, the redirected call identifying a driver object representing the image;
determine if the image is a kernel-mode image of a specified type after receiving the redirected call to the entry point to execute the routine in the image;
based on the driver object, in response to determining the image is the kernel-mode image of the specified type, provide a mechanism to intercept unloading of the image; and
in response to the mechanism intercepting the unloading of the image, recording the unloading of the image.

* * * * *